United States Patent Office 3,780,069
Patented Dec. 18, 1973

3,780,069
DIKETOCORIOLIN B AND PROCESS FOR THE
PRODUCTION THEREOF
Hamao Umezawa and Tomio Takeuchi, Tokyo, Japan,
assignors to Zaidan Hojin Biseibutsu Kagaku Kenkyu
Kai, Tokyo, Japan
Filed Feb. 10, 1971, Ser. No. 114,246
Claims priority, application Japan, Feb. 13, 1970,
45/11,965
Int. Cl. C07d 1/18
U.S. Cl. 260—348 C         2 Claims

ABSTRACT OF THE DISCLOSURE

Diketocoriolin B having anti-bacterial and anti-tumor activities and process for producing the same by culturing aerobically a microorganism capable of producing coriolin B in a nutrient medium, recovering the accumulated coriolin B and oxidizing said compound with an oxidizing agent.

---

This invention relates to an antitumor substance named diketocoriolin B and to the method of its production. Diketocoriolin B and coriolin B from which the former is derived are novel substances discovered by the present inventors. More particularly, the invention pertains to a process for producing diketocoriolin B by culturing a basidiomycetes to produce coriolin B, recovering the coriolin B and then oxidizing the same according to a known procedure to convert hydroxyl groups into ketone groups.

An object of the present invention is to provide a process for producing diketocoriolin B.

Another object of the invention is to provide a process for producing coriolin B, which is useful for the production of diketocoriolin B.

A still another object of the invention is to provide diketocoriolin B, which has inhibitory actions on Gram-positive bacteria, mouse leukaemia L–1210 and Ehrlich ascites tumor, and has actions to inhibit the growth of Yoshida sarcoma cells. The mode of action of this anti-tumor substance is unique, inhibiting transport adenosine-triphosphatase of cell membrane.

A further object of the invention is to provide diketocoriolin B.

Figure 1:
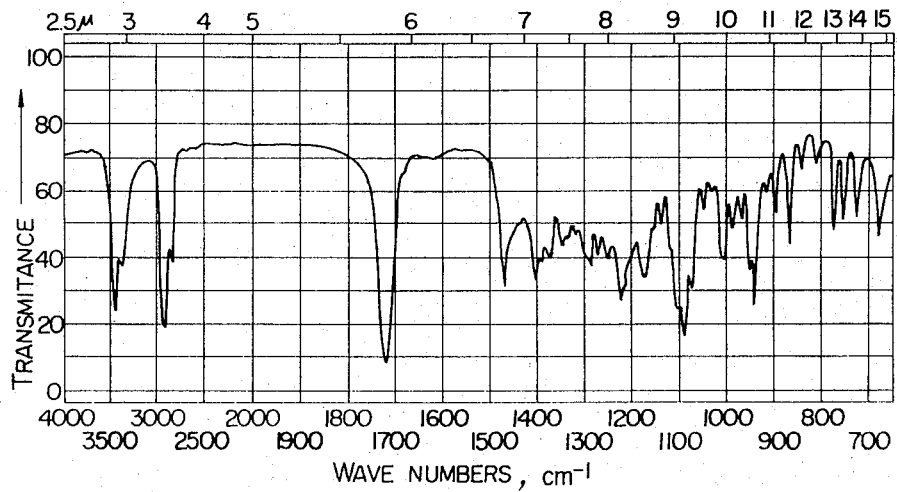
Figure 2:
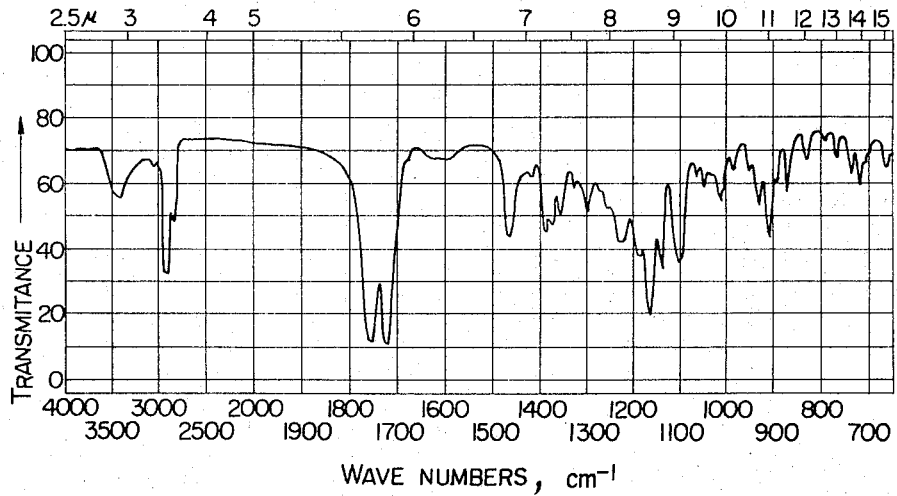

Other objects and a fuller understanding of the invention may be had by referring to the following description and claims, taken in conjunction with the accompanying drawings in which:

FIG. 1 shows infrared-absorption spectrum of coriolin B in potassium bromide pellet, and FIG. 2 shows infrared-absorption spectrum of diketocoriolin B in potassium bromide pellet.

Coriolin B produced according to the present invention shows no physiological activity, but the diketocoriolin B obtained by the oxidation of said coriolin B is a substance which, even when used in a slight amount, has inhibitory actions on Gram-positive bacteria, mouse leukaemia L–1210 and Ehrlich ascites tumor, and inhibits the growth of Yoshida sarcoma cells.

Coriolin B obtained according to the present process has such properties as mentioned below.

Coriolin B is obtained in the form of scales and melts at 215° to 216° C. It is soluble in methanol, ether, ethyl acetate, chloroform, benzene and acetone, but is hardly soluble or insoluble in carbon tetrachloride, n-hexane and water. Coriolin B shows no ultraviolet absorption other than end absorption. Infrared absorption spectrum of coriolin B taken in potassium bromide pellet is as shown in FIG. 1, and the main absorption wave numbers (cm.$^{-1}$) thereof are 3450, 3380, 2920, 1720, 1470, 1405, 1390, 1375, 1350, 1320, 1290, 1270, 1250, 1225, 1175, 1140, 1105, 1090, 1070, 1050, 1005, 990, 970, 950, 940, 895, 870, 845, 815, 775, 755, 730 and 680 cm.$^{-1}$. Coriolin B has the molecular weight of 408 as measured by mass spectrometry, and shows elemental analysis values of C.: 67.36% and H: 8.88% and contains no nitrogen. From the above-mentioned elemental analysis values and molecular weight measured by mass spectrometry, there is attained the molecular formula $C_{23}H_{36}O_6$ (molecular weight: 408).

As the result of chemical studies and of analysis of spectroscopic spectra, it has been found that coriolin B has the structural formula,

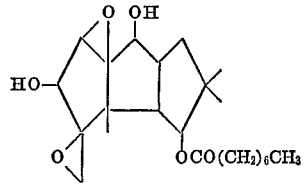

and thus is a caprylic acid ester of sesquiterpene.

Coriolin B is produced together with coriolin (Japanese patent application No. 27,611/69), which was invented by the systematic studies of the present inventors on antibiotics produced by basidiomycetes, by use of the same microorganism as in the case of said coriolin.

Microorganisms capable of producing coriolin B are those of Coriolus consors (Berk.) Imazeki (Irpex consors Berk.), which have been maintained at Agricultural School of Hokkaido University with accession No. AHU 4901 and at Institute for Fermentation, Osaka with accession No. IFO 5309. The strain was deposited at ATCC (American Type Culture Collection) with accession No. ATCC 20305. The description of Coriolus consors (Berk.) Imazeki is in Bulletin of Tokyo Science Museum, 6:80 (1943) with reference to the original description by Berk. in Journal of Linnen Society, 16:51 (1878).

Mycelia of a coriolin B-producing microorganism are inoculated into a suitable medium and aerobically cultured, whereby a cultured broth containing coriolin B is obtained. In this case, a solid culture method can be adopted, but, for mass production, a liquid culture method is more preferable. The culture temperature may be a temperature at which the coriolin B-producing microorganism can be grown, and is ordinarily 15° to 30° C., preferably 25° to 27° C. The medium for the production of coriolin B contains carbon sources, nitrogen sources, inorganic salts, growth-promoting materials, etc. Known carbon and nitrogen sources, which are ordinarily used for the culture of microorganisms, can be used to culture the coriolin B-producing microorganism. As the carbon sources, there may be used commercially available carbohydrates, oils and fats such as, for example, glucose, glycerin, starch, dextrin, maltose, lactose, saccharose, oils, fats and molasses. These may be used in pure or crude form. As the nitrogen sources, there may be used soybean powder, meat extract, peptone, dry beer yeast, yeast extract, corn steep liquor, caseine, cotton seed powder, fish meal, nitrate, amonium salt and urea. As the inorganic salts, there may be used sodium chloride, potassium chloride, magnesium sulfate, calcium carbonate and phosphate, and slight amounts of salts of such heavy metals as copper, manganese, iron and zinc.

As understood from its structure, coriolin B is biosynthesized from mevalonic acid, which is biosynthesized from acetic acid. As is well known in the studies of biosynthesis of materials obtained through intermediate of mevalonic acid in general, the addition of acetic or mevalonic acid, particularly dividedly, enhances the yield of coriolin B. The addition of a higher fatty acid or a fat also enhances the yield of coriolin B.

A medium which contains, for example, 5% of glucose, 0.2% of peptone, 0.5% of dry beer yeast, 0.2% of potassium dihydrogen phosphate, 0.1% of magnesium sulfate and 1.6% of calcium carbonate and which has been adjusted to pH 6.2 is one of media suitable for the production of coriolin B.

In a culture liquor, coriolin is present chiefly in the liquid portion, whereas coriolin B is present chiefly in the mycelium portion. The mycelium portion of the culture broth containing coriolin B is separated according to a known procedure such as filtration or centrifugal separation, and the mycelium obtained is extracted with an organic solvent, such as methanol, butanol, butyl acetate or acetone, whereby the coriolin B is extracted in the organic solvent. The organic solvent layer containing the extracted coriolin B is separated from the mycelium portion, and then the solvent is removed to obtain crude coriolin B. If necessary, a countercurrent distribution method or chromatographic method is employed as a means for removing impurities. The resulting powder containing the purified coriolin B is dissolved in a small amount of an organic solvent capable of dissolving coriolin B, such as methanol, ether or ethyl acetate and then a solvent capable of difficulty dissolving coriolin B such as n-hexane, water or carbon tetrachloride is added to the resulting solution, whereby the coriolin B can be crystallized as needles or scales. Coriolin B shows no anti-bacterial nor antitumor activities.

Diketocoriolin B is obtained by oxidizing coriolin B according to a known procedure for oxidizing secondary hydroxyl groups to ketones. Oxidizing agents usable in the above case include chromic anhydride in acetic acid and dimethyl sulfoxide-dicyclohexylcarbodiimide. Diketocoriolin B is obtained, for example, in the following manner:

Crystals of coriolin B are dissolved in acetic acid, and the resulting solution is charged with chromic anhydride and oxidized at 20° to 30° C. for 16 to 30 hours. To the reaction system is added water, and the resulting diketocoriolin B is extracted with ethyl acetate. The ethyl acetate layer is washed with a 0.1 N sodium hydroxide solution and further with water. The washed ethyl acetate layer is dehydrated with anhydrous sodium sulfate and then concentrated under reduced pressure to obtain a powder of crude diketocoriolin B. The crude diketocoriolin B is dissolved in a small amount of ether and then recrystallized from n-hexane to obtain diketocoriolin B in the form of colorless needles, M.P. 147°–148° C.

Diketocoriolin B is soluble in methanol, ether, ethyl acetate, acetone, chloroform and benzene, but is hardly soluble or insoluble in carbon tetrachloride, n-hexane and water. Diketocoriolin B shows no ultraviolet absorption other than end absorption. Infrared absorption spectrum of diketocoriolin B taken in potassium bromide pellet is as shown in FIG. 2, and the main absorption wave numbers (cm.$^{-1}$) thereof are 2940, 2915, 2840, 1760, 1720, 1465, 1390, 1370, 1355, 1300, 1230, 1220, 1190, 1165, 1140, 1100, 1010, 930, 905, 870, 830, 770, 740 and 720. Diketocoriolin B has a molecular weight of 404 as measured by mass spectrometry, and showed elemental analysis values of C: 69.02% and H: 8.08% and contains no nitrogen. From the above-mentioned elemental analysis values and the molecular weight measured by mass spectrometry, there is attained the molecular formula $$C_{23}H_{32}O_6$$

(molecular weight: 404).

As the result of chemical studies and of analysis of spectroscopic spectra, it has been found that diketocoriolin B has the structural formula,

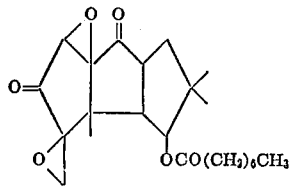

The anti-microbial activities of diketocoriolin B as measured according to agar dilution method were as follows.

Minimum inhibitory concentration (mcg./ml.)

Anti-microbial spectrum, test microorganism:
Staphylococcus aureus 209–P _____ 12.5
Staphylococcus aureus Terajima _____ 25.0
Staphylococcus aureus Smith _____ 12.5
Sarcina lutea 1001 _____ 12.5
Micrococcus flavus _____ 12.5
Bacillus anthracis _____ 12.5
Bacillus subtilis NRRL 558 _____ 25.0
Escherichia coli NIHJ _____ 50.0
Salmonella typhy _____ >100.0
Shigella flexneri 1a (Ew 8) _____ >100.0
Proteus vulgaris OX 19 _____ >100.0
Pseudomonas aeruginosa A$_3$ _____ 100.0
Klebsiella pneumoniae PCI 602 _____ >100.0

The activities of diketocoriolin B on mouse Ehrlich ascites tumor and mouse leukaemia L–1210 are set forth below.

Therapeutic tests on mouse Ehrlich ascites tumor were effected for 10 days, using diketocoriolin B in doses of 6.25 to 50 mcg./mouse/day. As the result, all control mice died within 26 days after inoculation of tumor cells, whereas 50%, 25%, 25% and 25% of mice, which had been intraperitoneally administered with diketocoriolin B in doses of 50 mcg., 25 mcg., 12.5 mcg. and 6.25 mcg., rspectively, were prolonged in life for more than 50 days, and no accumulation of ascites was observed in any of them. Further, in therapeutic tests on mouse leukaemia L–1210, mice, which had been administered with diketocoriolin B in doses of 200 to 125 mcg. under the same conditions as above, showed a survival index (number of survival days) of 178 to 157 per 100 of control mice, and were prolonged in life to substantially the same extent as that of mice which had been administered with 500 mcg. of cyclophosphamide under the same conditions as above. Thus, diketocoriolin B showed antitumor activities on tumors of mice. Furthermore, in the tissue culture of Yoshida sarcoma cells, 41.5% of the propagation thereof could be inhibited by use of diketocoriolin B in a dose of 0.63 mcg./ml.

Diketocoriolin B has low toxicity such that in the case where it was intraperitoneally administered to mice, the LD$_{50}$ thereof was 37.5 mg./kg., and in the case where it was continuously administered to mice for 10 days, 50% of the mice could survive for more than a month even when the total dose reached 75 mg./kg.

As sesquiterpenes having physiological activities among those produced by basidiomycetes, there are coriolin and illudin S and M, and as a substance similar in structure thereto, there is hirsutic acid C. These, however, are different in physicochemical properties, molecular formula and structural formula from diketocoriolin B and hence are distinguished therefrom.

The present invention is illustrated in further detail below with reference to examples, but it is an obvious fact for those skilled in the art that various modifications which are not shown in the examples can be made within the scope of the invention by use of the above-mentioned informations for coriolin B and diketocoriolin B. Accordingly, the present invention involves all of fermentation and chemical processes employed for the production of the coriolin B and diketocoriolin B, which have been disclosed by the present invention, and production processes comprising extraction, purification and oxidation procedures.

EXAMPLE 1

Sawdust (pit-sawdust) of *Magnolia hypoleuca* was immersed in water, boiled and then freed from water and heated to dryness. Into a 100 ml. shaking flask were charged 3 g. of the above-mentioned sawdust and 15 ml.

of a culture liquor containing 2% of glucose and 0.5% of dry beer yeast ("Ebios" produced by Ebios Pharmaceutical Co.). The flask was stoppered with cotton, and the culture medium was sterilized at 120° C. for 20 minutes. Into this culture medium was inoculated a coriolin B-producing microorganism, which had been slant cultured, and then the microorganism was subjected to stationary culture at 27° C. for 10 days. To the shaking flask was added 50 ml. of the above-mentioned culture liquor, which was then sufficiently shaken to prepare an inoculation source. Subsequently, the inoculation source was inoculated into a coriolin production medium containing 5% of glucose, 0.2% of peptone, 0.2% of potassium dihydrogen phosphate, 0.1% of magnesium sulfate, 1.6% of calcium carbonate and 0.5% of Ebios which had been sterilized at 120° C. for 10 minutes. The amount of the inoculation source was 10 ml. per 125 ml. of the production medium. The culture was effected in such a manner that 125 ml. of the above-mentioned production medium was separately charged into each of 500 ml. shaking flasks, and the inoculation source was inoculated into said medium and then subjected to shaking culture at 27° C. for 7 days. Thereafter, 3 liters of the thus cultured culture liquor was filtered to obtain 100 g. of a solid substance containing the mycelium. This substance was charged with 300 ml. of acetone and subjected to extraction with stirring, whereby coriolin B was extracted from the mycelium. The mycelium was filtered, and the filtrate was concentrated under reduced pressure to remove the acetone. Subsequently, the residue was extracted 2 times with 100 ml. of ethyl acetate and then dried under reduced pressure to obtain 4 g. of a brown substance. This crude substance was dissolved in a small amount of acetone, and the resulting solution was charged with n-hexane, until the solution became slightly turbid, and then allowed to cool, whereby crystals of coriolin B deposited. The crystals were recovered by filtration and then dried to obtain 1.5 g. of crystals of pure coriolin B.

EXAMPLE 2

1.5 grams of the crystals of coriolin B obtained in Example 1 were dissolved in 65 ml. of acetic acid. To the resulting solution was added 650 mg. of chromic anhydride, and the mixture was allowed to react at 25° C. for 24 hours. After the reaction, 600 ml. of water was added to the reaction mixture, which was then extracted 3 times with 300 ml. of ethyl acetate. The ethyl acetate layer was washed with 300 ml. of 0.1 N sodium hydroxide solution and then with 300 ml. of water, dehydrated with sodium sulfate and freed from the ethyl acetate by distillation under reduced pressure, whereby a white powder was obtained. This powder was dissolved in a small amount of ether, and the resulting solution was charged with n-hexane, until the solution became slightly turbid, and then allowed to cool to obtain 700 mg. of diketocoriolin B in the form of white needle-like crystals.

EXAMPLE 3

3 liters of an inoculation source prepared in the same manner as in Example 1 was inoculated into 40 l. of a medium containing 5% of glucose, 0.2% of peptone, 0.2% of potassium dihydrogen phosphate, 0.1% of magnesium sulfate, 1% of calcium carbonate and 0.01% of silicon oil which had been sterilized at 120° C. for 10 minutes in a 70 l. stainless steel culture tank, and then cultured at 27° C. for 10 days with introduction of air of 20 liters per minute and with stirring at 200 r.p.m. Subsequently, the cultured liquor was filtered to obtain 1.2 kg. of solid materials containing the mycelium. This mycelium mass was subjected to the same extraction and purification treatment for coriolin B as in Example 1 to obtain 51 g. of a crude substance, from which was then obtained 18 g. of crystalline coriolin B. The thus obtained coriolin B was subjected to the same oxidation treatment as in Example 2 to obtain 7.9 g. of crystalline diketocoriolin B.

What is claimed is:

1. Diketocoriolin B have the formula,

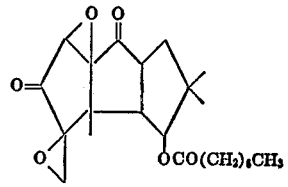

2. Coriolin B having the formula,

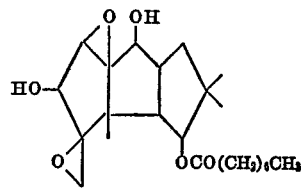

No references cited.

NORMA S. MILESTONE, Primary Examiner

U.S. Cl. X.R.

195—51 R